(12) United States Patent
Leone III et al.

(10) Patent No.: US 6,704,120 B1
(45) Date of Patent: Mar. 9, 2004

(54) PRODUCT TEMPLATE FOR A PERSONALIZED PRINTED PRODUCT INCORPORATING IMAGE PROCESSING OPERATIONS

(75) Inventors: Anthony J. Leone III, Pittsford, NY (US); David A. Kavanagh, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/451,729

(22) Filed: Dec. 1, 1999

(51) Int. Cl.[7] .............................................. G06K 15/00
(52) U.S. Cl. .................................................... 358/1.18
(58) Field of Search ................................ 358/1.11, 1.2, 358/1.6, 1.13, 1.18, 1.15, 540; 700/235; 705/26; 382/284; 715/505, 503, 515, 522

(56) References Cited

U.S. PATENT DOCUMENTS

| | | | |
|---|---|---|---|
| 5,056,029 A | 10/1991 | Cannon | 364/419 |
| 5,485,568 A | 1/1996 | Venable et al. | 395/155 |
| 5,765,142 A | 6/1998 | Allred et al. | 705/26 |
| 2002/0065578 A1 * | 5/2002 | Leone et al. | 700/235 |

* cited by examiner

Primary Examiner—Arthur G. Evans
(74) Attorney, Agent, or Firm—Aditya Krishnan

(57) ABSTRACT

For a personalized printed product that contains graphical elements, a data template in which instructions for operating on a graphical element are encoded. The data template can include the name of an executable computer program for accessing and downloading in order to generate the personalized printed product. Alternately, the data template can include source code that can be compiled and run by a computer, or machine code that is ready for execution. In a preferred embodiment, the data template is an XML file.

13 Claims, 6 Drawing Sheets

```
<Product Name="Retirement Invitation">
  <Page>
    <Surface>
      <Panel>
        <Location X="0.5" Y="0.75" />
        <Dimension Width="4.0" Height="1.0" />
        <Text>
          <Location X="0.25" Y="0.25" />
          <Dimension Width="3.5" Height="0.82" />
          <String>Guess who's</String>
          <Font Name="Goudy Handtools" Size="0.88" />
          <Color Red="23" Blue="128" Green="212" />
        </Text>
      </Panel>
      <Panel>
        <Location X="2.5" Y="3.0" />
        <Dimension Width="2.0" Height="2.75" />
        <Image Layer="2">
          <Location X="0.25" Y="0.25" />
          <Dimension Width="2.0" Height="2.25" />
          <Source>c:/scanner/images/latest.jpg</Source>
          <Crop X="0.1" Y="0.12" Width="1.8" Height="2.0"/>
          <ImageOp Apply="LAST" Code="http://img.xerox.com/dfrx/
          com.xerox.pix2.dfrx.Diffuse" Args="5.0 5.0" />
        </Image>
      </Panel>
    ...
    </Surface>
  </Page>
</Product>
```

FIG. 4

```
<Product Name="Retirement Invitation">
  <Page>
    <Surface>
      <Panel>
        <Location X="0.5" Y="0.75" />
        <Dimension Width="4.0" Height="1.0" />
        <Text>
          <Location X="0.25" Y="0.25" />
          <Dimension Width="3.5" Height="0.82" />
          <String>Guess who's</String>
          <Font Name="Arial" Size="0.6" />
          <Color Red="23" Blue="128" Green="212" />
        </Text>
      </Panel>
      <Panel>
        <Location X="2.5" Y="3.0" />
        <Dimension Width="2.0" Height="2.75" />
        <Image Layer="2">
          <Location X="0.25" Y="0.25" />
          <Dimension Width="2.0" Height="2.25" />
          <Source>c:/scanner/images/latest.jpg</Source>
          <Crop X="0.1" Y="0.12" Width="1.8" Height="2.0" />
          <ImageOp Apply="LAST" Code="import java.awt.*;
import java.awt.image.*;
public class DecalsulateOp extends BufferedImageOp {
  RenderingHints hints;
  private int bits = 6;
  ...
  " Args="6 18" />
      </Image>
    </Panel>
    ...
  </Surface>
</Page>
</Product>
```

```
<Product Name="Retirement Invitation">
<Page>
<Surface>
<Panel>
<Location X="0.5" Y="0.75" />
<Dimension Width="4.0" Height="1.0" />
<Text>
    <Location X="0.25" Y="0.25" />
    <Dimension Width="3.5" Height="0.82" />
    <String>Guess who's</String>
    <Font Name="Arial" Size="0.6" />
    <Color Red="23" Blue="128" Green="212" />
</Text>
</Panel>
<Panel>
<Location X="2.5" Y="3.0" />
<Dimension Width="2.0" Height="2.75" />
<Image Layer="2">
    <Location X="0.25" Y="0.25" />
    <Dimension Width="2.0" Height="2.25" />
    <Source>c:/scanner/images/latest.jpg</Source>
    <Crop X="0.1" Y="0.1" Width="1.8" Height="2.0" />
    <ImageOp Apply="LAST" Code="CAFEBABEAC76234DE8290A8A672BC..." />  ⎫
                                                                      ⎬ 30
                                                                      ⎭
...
</Image>
</Panel>
...
</Surface>
</Page>
</Product>
```

PRODUCT TEMPLATE FOR A PERSONALIZED PRINTED PRODUCT INCORPORATING IMAGE PROCESSING OPERATIONS

FIELD OF THE INVENTION

This invention relates generally to apparatus for creation and printing of a personalized print product and more particularly to a product template for a personalized print product, where the product template incorporates an image processing operation for a scanned image.

BACKGROUND OF THE INVENTION

Apparatus for in-store creation of personalized cards and invitations and similar printed products allow a customer to select a suitable design from among a number of available designs and to customize the selected design by specifying the text content or by inputting an image from a scanned photo or other source. To operate an apparatus that produces personalized print products, an operator (usually a customer or possibly a store clerk assisting a customer) selects a product design from a set of displayed options on a display monitor. Once the operator selects a design, the apparatus prompts the operator to enter or select the appropriate text to be inserted at predetermined locations on the design and prompts the operator to scan a photo image (or to input an image from some other source) for display on the card.

Such apparatus typically store each design as a data template. A data template can include such information as size, background, color, text font, index position for customer photo, optional text areas, and similar information. These apparatus typically store multiple templates in a database of some type, as is disclosed in U.S. Pat. No. 5,765,142 (Allred et al.) and U.S. Pat. No. 5,056,029 (Cannon).

Among available methods that can be used to define a product template are a number of page-definition languages and standards for data presentation. The most promising of these standards in current use is XML (Extensible Markup Language), which is the result of an adaptation of the fully featured SGML (Standard Generalized Markup Language, ISO 8879; 1986(E)), specifically adapted to represent data, including documents. XML allows a designer to define specific components for a document, and to define how these components are displayed and to specify valid data fields for each component. To contain the set of definitions for individual data elements, XML uses a Data Type Dictionary (DTD) that defines valid fields. This arrangement allows widespread use of a document published using XML. Using an XML file and its associated DTD, an application program can then determine how to publish the XML data.

XML itself provides a way of representing a document as data. An application program must be constructed to access the XML representation and to provide a printable document with this XML representation as its source. XML does not provide any structures or method for incorporating built-in operations that modify document data. To perform any automated operation on XML document data (for example, to alter an image or to compose text on a page layout), a separate application program must parse an XML file to identify document data to be operated upon. The application program would then need to include logic and instructions for operating upon the document data.

Conventional systems allow an operator to have some minimal control over the appearance of the scanned image and control over its placement on a greeting card, invitation, or similar product. However, when possible, it is preferred to automate image manipulation as much as possible. This automation helps to minimize the number of steps required for an operator, minimizing the likelihood of operator error that might lead to frustration, disappointment with the printed output, and dissatisfaction with the apparatus that creates the personalized printed product.

With this type of automation as a design goal, an application program for greeting card setup may, based on a controlling data template, automatically calculate a scaling factor for a scanned image based on its original size. The application program can then scale and crop the scanned image accordingly to place it in position on the page layout, without the need for operator interaction.

There are a number of commercially available digital imaging systems that allow a customer to personalize a reprint or enlargement of an image from a scanned photograph, negative, slide, digital camera, or other source. This personalization can be performed by adding text, by adding decorative borders, and by similar operations that enhance the original image. Digital imaging systems that allow a customer to participate in personalizing a reprint include the KODAK Picture Maker system, manufactured by Eastman Kodak Company, Rochester, N.Y., the Fuji Aladdin system, manufactured by Fuji Photofilm, Japan, and the Photo Ditto System, manufactured by Pixel Magic Imaging, Inc., San Marcos, Tex. As standard components, these systems include a print scanner, a control console (typically a touchscreen monitor) for operator commands interface, a computer for image processing, and an output printer. These systems can be installed on a store countertop, where an operator (typically, a retail clerk) scans a customer photograph and, with the customer looking on, adds text or other image personalization. Or, these systems can be installed within a cabinet or kiosk for self-serve operation, where a retail clerk assists the customer as necessary.

Systems such as the Picture Maker, Aladdin, and Photo Ditto systems are intended to provide reprints or enhanced reprints of photographs. Such systems can be seen as a substitute for standard, silver-halide-based reprinting of photographs, with some enhancements. The enhancements provided by these systems may optionally place the photographic reprint within a graphic border, place text on a portion of the photographic image, or arrange reprint images within a fixed graphic layout. These systems also allow improvement of the reprint photographic image, with interface tools that allow an operator to improve brightness and color balance, and to remove image anomalies such as "red-eye" effects.

When incorporating a customer image into a greeting card, invitation, or similar personalized printed product, accurate emulation of a photograph may not suit the design intent of the card. Instead of the realistic treatment of an image provided by a photograph, a greeting card designer may want to present an "artistic" treatment of a customer image. To achieve an artistic treatment in greeting cards, invitations, and the like, it may be beneficial to provide additional image enhancement capabilities, above and beyond what Picture Maker, Aladdin, and Photo Ditto systems typically provide. This could include providing ways to modify an image for aesthetic effect. For example, graphics programs such as Adobe Photoshop and Quark Xpress allow an image to be altered dramatically through the use of "filters". In such a graphics program, an operator can aesthetically alter a scanned photographic image to make it appear as if embossed, as if created using pastels or watercolors, or as if painted using a wide range of techniques (palette knife, paint daubs). Numerous other special effects are also available. These image modifications could serve the purpose of suiting an image to a design, so that the final printed product would have the appearance and emotional impact of a well-designed greeting card as opposed to the appearance of an "enhanced" photograph. Currently, in consumer-operated imaging systems, capabilities to enhance images using imaging filters are provided only for minor color or brightness adjustments. Full-fledged image modification capabilities for suiting an image to a design are available only on more sophisticated imaging systems that require a skilled operator/artist. Automating the utilities that provide these image modifications would allow their use by an unskilled operator in preparing a greeting card, invitation, or similar type of personalized printed product.

The conventional approach to providing a utility for image enhancement is to build such a utility directly into the software application or as a utility provided along with the software application. However, this strategy has pronounced drawbacks for a system providing personalized printed products. By the nature of the greeting cards marketplace, card designs need to be regularly updated, both to provide a continuing stream of new products for consumers and to meet seasonal needs. Greeting card design options would be constrained if there were a limited set of image modification utilities available on a system. As new card designs require additional imaging utilities, the software application on such a system would need to be continually upgraded. This software application would need to have accessible a large library of image modification filters, designed to handle all possible enhancements that might be required by a design, today or in the future. The advantage of the ability to distribute new card designs by issuing new templates would be negated by the requirement that the software application that uses these templates be upgraded at the same time if new imaging utilities are required in the templates. The size of the software application would also grow each time templates are added or changed, complicating the upgrade task and requiring substantial computer disk space and memory resources.

There are existing document templates that incorporate image processing commands and instructions. Commonly assigned U.S. Pat. No. 5,485,568 (Venable et al.) discloses use of a structured image document template that includes built-in IPOs (image processing operations) including image transformers, filters, colorizers, and masks. This arrangement would solve the problem of providing a set of well-defined image modification operations that can be readily automated in order to suit the needs of a specific aesthetic design. However, the solutions presented in U.S. Pat. No. 5,485,568 require the software application program itself to provide the imaging utilities. There is no way to specify new imaging utilities when using such a solution without requiring an update to the application software. Only the set of imaging utilities loaded with the last update of application software would be available.

There are also existing data formats used to store documents, including images, as data files. In this regard, a language such as PostScript can be used to represent a document, with a PostScript file including image bitmap data. The PostScript language includes built-in operators capable of modifying the presentation of stored image data, to perform functions such as scaling and transformation, for example. However, the range of image manipulation utilities is limited to a handful of such operations, all using programmed commands defined in the PostScript language. Languages such as PostScript do not provide any method for invoking a separately stored utility or program for changing the appearance of an image. Nor do these languages provide any mechanism for storing executable instructions for image manipulation within the body of the stored document (except for executable instructions that are part of the inherent command set of the programming language itself).

Thus, it can be seen that there is a need for providing a flexible set of imaging utilities for automated enhancement of personalized printed products, where the set of imaging utilities can be regularly updated and available to customers in preparing personalized printed products.

SUMMARY OF THE INVENTION

With this goal in view, the present invention provides a product template that initiates image processing operations for a personalized printed product and a method of using such a product template. The present invention defines an apparatus for preparing a personalized printed product comprising a graphical component, said apparatus comprising a computer configured to accept image input, to accept user commands, and to print to a printer capable of producing the personalized printed product; a data template associated with the personalized printed product and comprising a field identifying the graphical component and an instruction for operating on the graphical component; and a software program capable of using the instruction in the data template in order to operate on the graphical component.

A feature of the present invention is the use of a specific field in a product template that specifies an image processing operation to be carried out and identifies a location from which application code for that operation can be downloaded.

Yet another feature of the present invention is an image processing operation included as an executable stored within a product template itself.

It is an advantage of the present invention that it allows a new personalized printed product to be introduced that uses an image processing operation that is not available with the original software application itself. A new image processing operation can be made available by means of a network connection to a remote host that supplies executable program code for implementing the operation. Optionally, the source code for an image processing operation can be built into a product template itself.

It is a further advantage of the present invention that it allows an image processing operation to be defined, accessed, and used independently from a software application that controls how a personalized printed product is created using the image processing operation.

These and other objects and advantages of the present invention will become apparent in the following description.

DETAILED DESCRIPTION OF THE INVENTION

The generic term "personalized printed product", identifying a printed item generally numbered 10 in the following description, is used to encompass the output of a system designed to produce any of a number of types of printed output products such as the following:

Greeting cards;
Invitations;
Calendars;
Announcements;

Business materials (for example, sales sheets, real estate brochures, and the like).

Such products are "personalized" by their use of customer images, by customer selection of graphical and text components, and by customer entry of text messages.

The generic term "graphical component" generally refers to any graphical object that is incorporated in the layout of a personalized printed product. Graphical components can include such objects as text strings, scanned images provided by a customer, or "canned" graphics such as borders and backgrounds, as well as clip art, syndicated cartoon characters, and the like.

The term "product template", or more generally "template" as used here, refers to a structured data format for representing the composition of a personalized printed product as a layout comprising graphical components. In the preferred embodiment, a product template is stored in a computer using XML language format; however, the methods described below using an XML template could be alternately applied to another standard or proprietary document data storage format.

The term "image processing operation" indicates an automated tool that modifies digital image data to alter the appearance of an image in some controlled manner. By way of example, and not by way of limitation, image processing operations include the following:

Posterization
Diffusion
Blur techniques
Distortion
Noise addition
Sharpening
Texturing Image processing operations can include techniques that modify image data to provide an artistic appearance, similar to tools available using Adobe Photoshop software. These techniques, for example, allow an operator to manipulate a scanned photograph in order to provide the appearance that the image was created using watercolors, color pencils, charcoal, pastels, or other media. Available techniques can also provide raised or embossed appearance, texturing, and other changes.

FIG. 1A shows the front page of a personalized printed product having a number of graphical components. Here, product 10 is an invitation that can be printed in duplex (although only the front side is shown). A text heading 12 and a text footer 14 provide a standard message. A customer image 16 is typically scanned from a photograph (but alternately can be from an alternate source, such as from a slide or negative, a digital camera image, an image stored on CD-ROM or diskette, or any image provided as input in digitized form). In FIG. 1A, customer image 16 is printed as a photographic likeness. Here, without any applied image processing operation, the photograph has a "realistic" effect and is functional, but gives the overall design of personalized printed product 10 a relatively "boxy" appearance.

FIG. 1B shows the personalized printed product 10 of FIG. 1A where the same customer image 16 undergoes an automatic image processing operation (diffusion in this example). The image processing operation specified in the product template dramatically alters the appearance of customer image 16. The layout or placement of components is the same in FIGS. 1A and 1B. But the use of an image processing operation, selected by a skilled designer, can make a distinct difference in the overall appearance and emotional/aesthetic impact of printed product 10 as suggested in FIG. 1B.

The block diagram of FIG. 2 shows the relationship of software application and data structures in an apparatus that is used to generate personalized printed product 10 having a graphical component 14 and provide image processing operations for modifying customer image 16 in the present invention. An application 60 is the controlling software program running on a computer that generates a personalized printed product 10. Operator selection and interaction at a user interface 74 (for example, a touchscreen monitor) allows a customer to select a specific design from displayed previews and screen prompts. Application 60 associates each distinctive design for personalized printed product 10 with a product template 56. One or more product templates 56 are stored in a templates database 58 that is accessed by application 60. Templates database 58 could be implemented using a database product (such as ORACLE Database software from Oracle Corporation, Redwood Shores, Calif.) or could simply be implemented as part of a structured file system where directories contain multiple product template 56 files. A document type definitions file 70, which can also be stored in templates database 58 as shown in FIG. 2, defines the allowable data fields in any product template 56. Application 60 accesses both the appropriate product template 56 and document type definitions 70 to determine the layout of components in personalized printed product 10.

Using methods well-known in the user interface programming art, application 60 uses a sequence of prompts and instructions to guide the operator through the steps necessary to input text and graphics for creation of personalized printed product 10. An image input device 76 scans the original for customer images 16 used in the layout for personalized printed product 10.

Application 60 obtains customer image 16 and determines, from instructions in product template 56, that an image processing operation is required. Fields in product template 56 can identify the location of an image processing program 80 that is accessible to application 60 for performing the image processing operation. This location may be at a remote host 72, as illustrated in FIG. 2. In such a case, remote host 72 may download image processing program 80 to be run under the control of application 60. It should be noted that image processing program 80 need not be on a separate host computer, but could alternately be locally stored on the same computer that hosts application 60.

FIG. 3 shows a hardware embodiment of the present invention. An application host 82 runs application 60. A monitor 90 provides user interface 74 functions. A scanner 86 acts as image input device 76, providing scanned image data from customer photographs placed on a platen 92. A printer 84 provides the personalized printed product 10 as final output. Communication between application host 82 and remote host 72 is over a network 88.

DESCRIPTION OF THE PREFERRED EMBODIMENT

The preferred embodiment of this invention employs standard, off-the-shelf components. Application host 82 is a computer such as a Gateway E3200 450 PC from Gateway, North Sioux City, S.Dak. (that includes monitor 90). Scanner 86 is an Epson 800 Print Scanner from Seiko Epson Corporation (Nagano, Japan). Printer 84 is a Docucolor 12 Printer from Xerox Corporation, Stamford, Conn. Remote host 72 is a Gateway E3200 450 PC. Templates database 58 is locally stored on application host 82, but could optionally be stored on a remote host 72 or on a networked storage device. Network 88 is an ethernet network, but could use a network link employing other standard or proprietary interface schemes.

The preferred embodiment of this invention uses Java software for application 60. Therefore, application host 82 must have the Java Runtime Environment (JRE) software installed, to provide the necessary interpreter and classes for software operation, as is well-known in the computer art. In the object-oriented Java environment, an image processing program 80 can be downloaded (from remote host 72) as a Java class. In Java parlance, a "class" is an object, a data structure that includes data and executable functions, termed "methods". A Java class is compiled (into Java byte-code) from a Java source file. The Java program running as application 60 can run a downloaded class using techniques well known in the programming art.

In the present invention, product template 56 specifies an image processing operation using any of the following approaches, as illustrated in the examples of FIGS. 4, 5, and 6:

(a) by specifying an image processing program 80 that is to separable from application 60, where program 80 can be preferably available as a Java class that can be downloaded from remote host 72;

(b) as source code embedded within product template 56 itself; or (c) as executable code embedded within product template 56 itself.

Each of the options listed above could be implemented using Java. For example, a Java source code listing could be provided as (b) above. Or, Java byte-code could be provided as (c) above.

FIG. 4 shows a portion of an XML product template 56 that describes personalized printed product 10 shown in FIG. 1B. Referring to FIG. 4, a product definition is bounded by a pair of Product fields 40a and 40b, with a suitable name provided for the personalized printed product. A page definition, defining what goes on a sheet of paper output, is bounded by a pair of Page fields 42a and 42b. A pair of Surface fields 44a and 44b bound the graphical components that go on a front side 28 or back side of the invitation. Pairs of Panel fields 46a1/a2 and 46b1/b2 bound the definition for panels 26a and 26b, respectively, as are represented in FIG. 1A. Rectangular panels 26a/b/c define each area of the surface that receives an image, text, or graphic. (Panel 26c would require similar data structure as is shown for panel 26a in FIG. 4.)

The definition for panel 26a, bounded by fields 46a1 and 46a2, gives expected information defining location and dimensions for this rectangular text area. Text fields 48a and 48b bound the definition for text appearing in panel 26a. As these fields show, the definition includes the text string along with specification of font, size and color, and location.

In similar fashion, a pair of Image fields 50a and 50b bound the definition for customer image 16 contained in panel 26b. The image definition includes standard fields listing image source, dimensions, and location within panel 26b. Source field 36 identifies a filename for the customer image (in this example, a default file location to which a print scanner copies the image last scanned).

An ImageOp field 38 flags information on the image processing operation to be performed. A Code field 30 identifies the specific image processing program 80 that executes on the data for customer image 16. Argument (Args) fields 32 provide operating parameters for the identified image processing program 80. As shown in the example of FIG. 4, image processing program 80 can be obtained using standard HTTP protocol, such as is commonly used for Web browsers. Program 80, when applied to customer image 16, provides a diffusion filter that provides the resultant effect shown in FIG. 1B.

FIG. 5 shows a segment of product template 56 where Code field contains source code. Here, a segment from the beginning portion of a Java class is shown. In this example, the Java class is based on (that is, "extends") the BufferedImageOp class that is currently provided as a standard part of the Java Development Environment. (This class includes a standard filter operation that can be used as a basis for developing custom filters for image processing.) With the arrangement shown in FIG. 5, application 60 would compile the Java source code and run it in order to provide the image processing operation.

FIG. 6 shows a segment of product template 56 where Code field contains executable code. Here, a segment from the beginning portion of a Java class file (in byte-code form) is shown. For this type of executable, application 60 can run the code directly when needed.

In execution, host application 60 parses product template 56 to create personal printed product 10. When application 60 identifies ImageOp field 38, application 60 responds appropriately:

if ImageOp field 38 identifies a Java class by name (as in FIG. 4), application 60 downloads and executes the Java class as image processing program 80 to process the corresponding image data;

if ImageOp field 38 provides Java source code (as in FIG. 5), application 60 compiles the source code, then executes the resulting byte-code to process the corresponding image data;

if ImageOp field 38 provides Java byte-code (machine code), application 60 executes the byte-code to process the corresponding image data.

ALTERNATIVE EMBODIMENTS

The above specification describes a preferred embodiment of the present invention. However, other embodiments are allowable, within the scope of the present invention. For example, the present invention could be used with any suitable programming language. A downloaded program or Java class could itself upload customer image 16 to remote host 72 for processing on another device that might provide faster or more powerful imaging capabilities. Any number of image processing operations could be provided, whether downloaded from remote host 72 or included in product templates 56.

It should be noted that an image processing operation can be applied to any graphical components be it customer image, text, or other graphic.

A downloaded Java class that serves as image processing program 80 could optionally be embodied as an applet. This would allow application 60 to operate within a Web browser, offering the advantage of widespread access to imaging and printing capabilities for internet users.

It can be readily seen that this invention allows a designer of a greeting card, for example, to specify a image processing operation that is optimal for integrating customer images in a design, to provide an aesthetically pleasing printed output. The designer can exercise significant freedom in selecting an optimal image processing operation.

Therefore, what is provided is a data template for a personalized printed product incorporating image processing operations.

BRIEF DESCRIPTION OF THE DRAWINGS

FIG. 4 shows sample XML code in a product template that defines an image processing operation carried out on the customer image for the product illustrated in FIG. 1B.

FIG. 5 shows sample XML code in a product template where the template itself contains executable source code for an image processing operation.

FIG. 6 shows sample XML code in a product template where the template itself contains executable byte-code for an image processing operation.

PARTS LIST

Figure 1A:
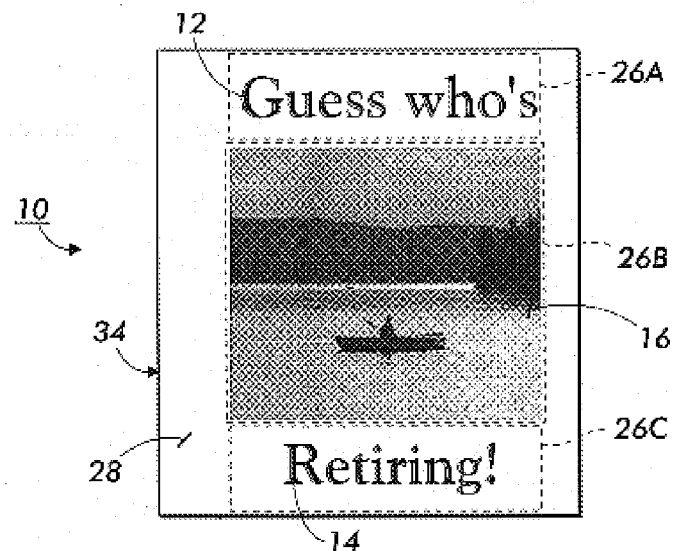
FIGS. 1A and 1B are plan views showing example versions of a personalized printed product, without and with an applied image processing operation, created using a product template of the present invention.
Figure 1B:
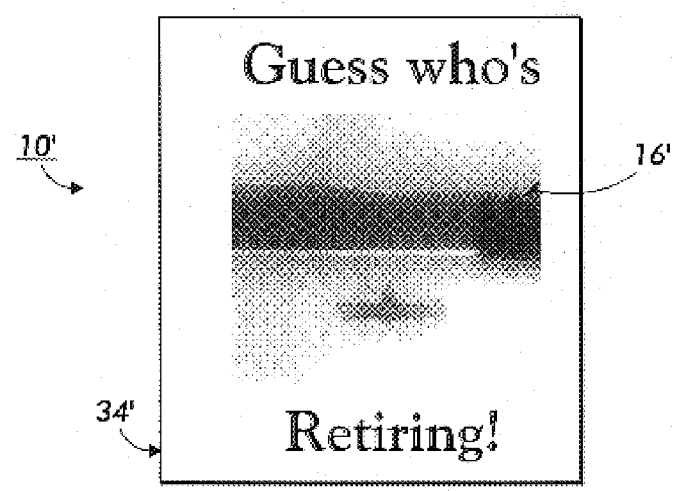
Figure 2:
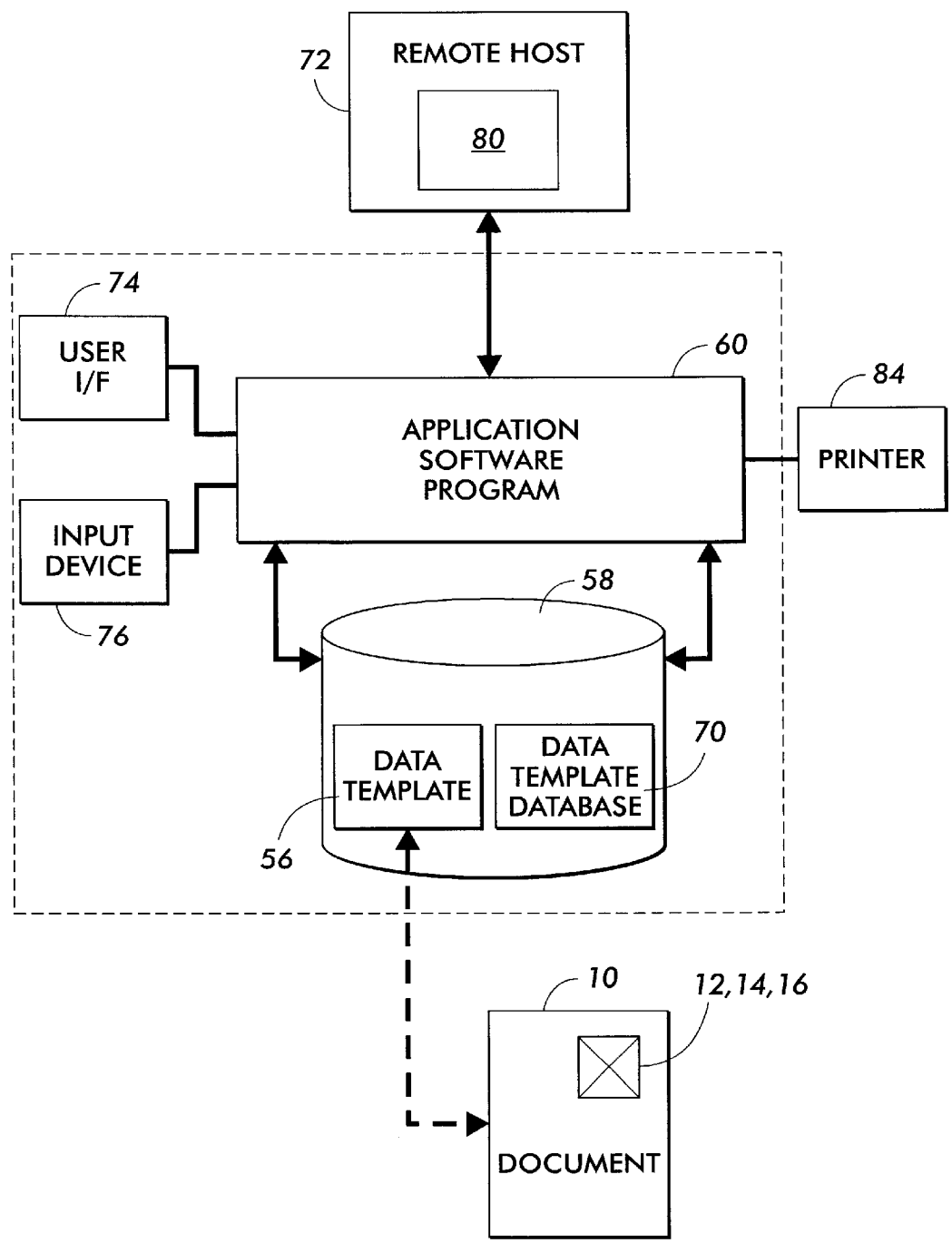
FIG. 2 is a block diagram showing the relationship of key functional structures in an apparatus that processes a product template in order to print a personalized printed product.
Figure 3:
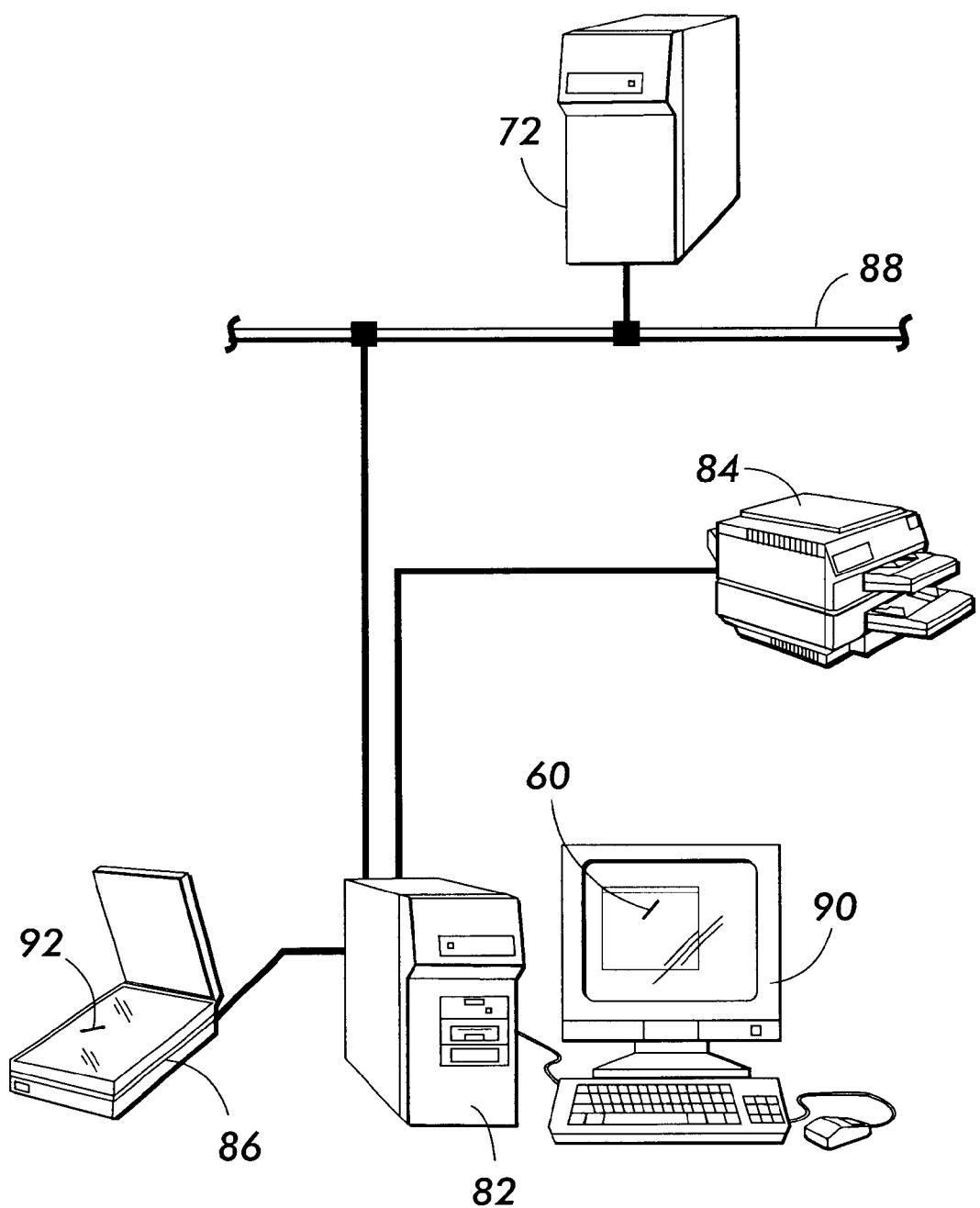
FIG. 3 is a perspective view showing the relationship of key hardware components and networking used for preparation and processing of a personalized printed product.

10. Personalized printed product
12. Text heading
14. Graphical component
16. Customer image
26a/b/c. Panel
28. Front side
30. Code field
32. Argument field
34. Fold line
36. Source field
38. ImageOp field
40a/b. Product field
42a/b. Page field
44a/b. Surface field
46a1/a2/b1/b2. Panel field
48a/b. Text field
50a/b. Image field
56. Product template
58. Templates database
60. Application
70. Document type definitions
72. Remote host
74. User interface
76. Image input device
80. Image processing program
82. Application host
84. Printer
86. Scanner
88. Network
90. Monitor

What is claimed is:

1. An apparatus for preparing a personalized printed product including a computer configured to accept image input, to accept user commands, and to print to a printer capable of producing the personalized printed product comprising a graphical component, said apparatus comprising:
    (a) a data template associated with the personalized printed product, said data template comprising:
        (1) a field associated with the identifying the graphical component;
        (2) at least an instruction for operating on the graphical component by said computer; and
    (b) a first software program that runs on said computer, the first program capable of interpreting said instruction associated with the field provided in said data template in order to operate on the graphical component.

2. The apparatus of claim 1 wherein said instruction specifies a second software program, said second software program capable of being invoked by said first software program.

3. The apparatus of claim 1 wherein said instruction is a source code instruction.

4. The apparatus of claim 1 wherein said instruction is a machine code instruction.

5. A data template that defines a personalized printed product where said printed product comprises a graphical component capable of being modified by a computer operation, said data template comprising:
    (a) a field identifying said graphical component wherein said graphical component being an image or text defined by the identifying field; and
    (b) an instruction being a language code or program name interpretable by a computer for operating upon said graphical component.

6. The data template of claim 5 wherein said instruction is a source code instruction.

7. The data template of claim 5 wherein said instruction is a machine code instruction.

8. The data template of claim 5 wherein said instruction identifies a software program capable of being invoked by the computer.

9. The data template of claim 5 encoded using XML language.

10. A method for defining a personalized printed product using a data template that consists of at least one graphical component, said method comprising:
    (a) generating a data template that identifies the graphical component;
    (b) encoding, in said data template, an instruction to operate upon the graphical component; and
    (c) providing an application program on a computer, said application program configured to interpret said data template and to operate upon the graphical component in accordance with said instruction encoded in said data template.

11. The method of claim 10 wherein the step of encoding, in said data template, an instruction comprises the step of providing the name of an executable computer program.

12. The method of claim 10 wherein the step of encoding, in said data template, an instruction comprises the step of providing a source code instruction which is capable of being interpreted by the computer.

13. The method of claim 10 wherein the step of encoding, in said data template, an instruction comprises the step of providing a machine code instruction which is capable of being interpreted by the computer.

* * * * *